Nov. 20, 1934.    R. J. MILLER    1,981,461
FLYING EQUIPMENT
Filed March 22, 1932

Inventor:
ROBERT J. MILLER.
By: *Phil J. Nawn*
Attorney.

Patented Nov. 20, 1934

1,981,461

UNITED STATES PATENT OFFICE 1,981,461

FLYING EQUIPMENT

Robert J. Miller, Milwaukee, Wis.

Application March 22, 1932, Serial No. 601,698

3 Claims. (Cl. 244—21)

This invention relates to flying equipment means serviceable in the aeronautical arts where aeroplanes or dirigible air craft is concerned.

The providing of a shock absorbing coupling means uniting an aeroplane and a descent retarding body which will permit of separating the structures connected while in the air, and also upon landing when the severing of relations may be automatically or manually performed in order to escape damage through dragging after landing has been effected.

The offering of a sustaining parachute which can be arranged as a utilitarian adjunct forming, under normal conditions, a part of the inclosing fuselage structure, while adapted to be released for expansion above a plane to whose skeleton structure the parachute is attached for retarding descent of same, and for the sustaining of those aboard in case of fire or unmanageability of a plane, which latter may be readily cut loose to leave the occupants free of the disabled plane but supported by parachute means whose efficient size is allowable by virtue of the dual function which makes this element also a structural feature of the plane's passenger compartment.

Other advantages will be noted throughout the particular description, the essential features being set forth in the appended claims both sections of this disclosure having reference to the accompanying drawing which forms a part of this application.

The several figures of the drawing are indexed as follows:—

Similar characters of reference apply to like features throughout the several views.

The disclosing structure is necessarily diagrammatic with regard to those detail essentials of actual structure. The various applications of the principles involved are varied, especially in the manner of preserving life, as there are various ways by which a plurality of individuals may be held suspendedly by a parachute or equivalent supporting means. Also the arranging of this essential element to accord with the design of a cabin structure per se while lending itself as a releasable attachment that is studiedly connected to the aeroplane at points, and to elements, regarded practical but only suggested here because of the variety in plane architecture and those incidental preferences determined by the designers of air-craft. The thought here is to lend a double function to an element requiring massive expanse, and the masking of this element's volume by adapting it to function as, for instance, the roof of a fuselage, through binding means suggested in my co-pending application filed Apr. 4, 1931, Serial No. 527,658, and also where there appears an initial inflating aid "3" which latter will hasten the rising and ultimate expansion of an otherwise unnoticed structural feature draped in storing same to be of utilitarian value, free to accord with whatever streamline the fuselage of a plane may assume. For the reasons just given this disclosure includes those features of structure which do not patentably rise above the diagrammatic delineation of a construction readily developed by those skilled in the concerned art.

Figure 1:
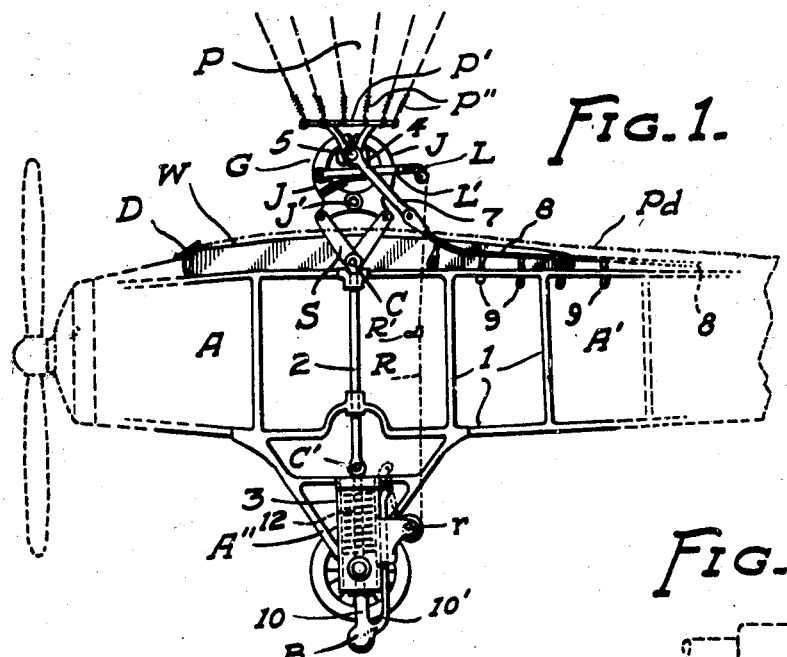
Fig. 1 is a general view showing the invention as same is incorporated with a conventional aeroplane.
Figure 2:
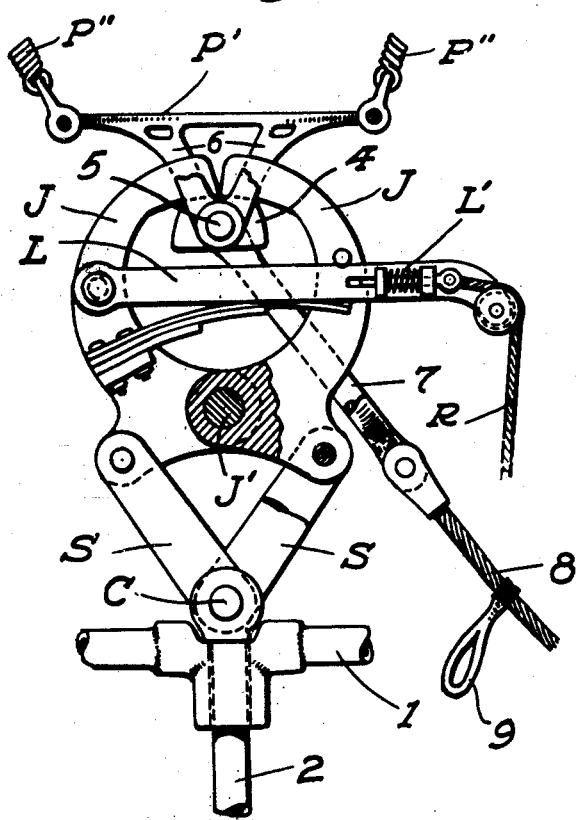
Fig. 2 is an enlarged fragmentary view illustrating the coupling means employed for uniting together an aeroplane and a parachute.
Figure 3:
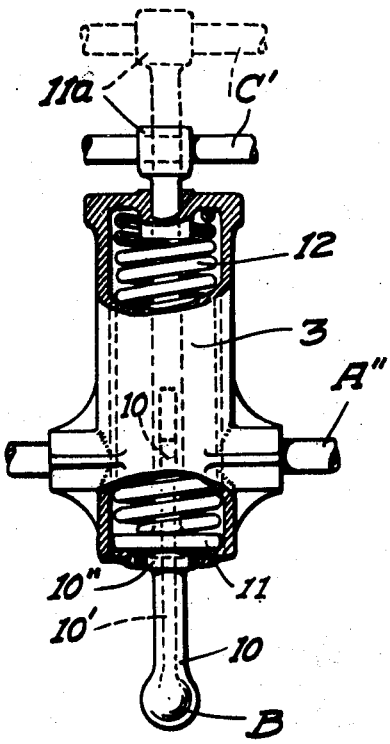
Fig. 3 is a view of the shock-cushioning means which functions, both at the ultimate expanding of the parachute, and at the plane's contact with a landing surface.

Referring to the drawing, an aeroplane A having a conventional skeleton framework 1, a cabin or fuselage A' and a landing gear A'' is shown in Fig. 1 to be supported by a parachute, not shown, whose shrouds or guy ropes P are connected to a conventional ring 'P' by resilient attachments or spring terminals P'' which supplement a requisite shock absorbing feature to be later described.

The aforesaid parachute and aeroplane are coupled together by means of a grapple assembly G which is designed to allow of separating said parachute and plane when disconnection is urgent. The said grapple means is also affected manually or automatically upon landing, or selectively prior to landing in order to release the parachute's force which may be directed towards a greater danger beyond a possible and less hazardous landing point, thus allowing a choice between minor and major phases of an already precarious but mandatory adventure.

Normally the folded parachute will occupy the area indicated by the dotted line Pd. This area will obtain medially of the wings W where the said parachute will be stored in a manner that will reproduce the curvature of the wings and the contours of the fuselage top or roof, having a suitable wind tunnel inlet at D to aid in the raising of said parachute similar to what is disclosed in the above cited application.

The aforesaid grapple assembly comprises a set of jaws J pivoted at J' beyond which fulcrum point are connected links S which, in turn, are pivoted to a cross-bar C that forms the upper member of a framework portion of the skeleton 2, arranged to allow limited reciprocation in the rigidly fixed skeleton 1, under the restraint of a shock-absorbing assembly suitably housed in an inclosure 3 medially disposed in the landing gear A''. The jaws are locked when closed by any appropriate latching means co-operative with a bar element L that will snap into locking relation for holding the jaws closed and responsive to a pulling draft upon the trip rope R for releasing the parts locked in a manner well-known in devices common in applications of this kind. The said rope passes through the cabin down to the landing gear A''. The said jaws clamp over a suitable enlargement 4 which is integral with trunnions 5 to which latter are saddled depended lugs 6 that form a part of the parachute ring P'. A bail-like member 7 is also pivoted on the said trunnions and from this bail depends a flexible ladder-like appendage 8 which normally lies under the parachute-top of the cabin along the fuselage portion of the aeroplane, so that a series of loops or life-belts 9 will dispose themselves within easy reach of the cabin's occupants.

The landing gear A'' will be any form of the accepted designs appropriate which will allow the cylindrical casing 3 to be mounted medially so as to dispose a rod 10 that terminates in a bumper B and has also a collar 10'' which normally abuts a disc 11 terminating a tubular ended rod 11a. The rod 10 upwardly extends to retainedly slide in the said tubular end and its shouldering relation allows the said bumper a cushion effect. The rod 11a upwardly extends to where it connects with the cross bar C'. With this provision the bumper rod 10 is not disturbed by the action of any upward pull upon the rod 11a while remaining disposed to use the same resilient cushioning offered by a spring 12 which is compressed by a pull from the rod 11a and a pushing action of the bumper B upon landing. This sort of cushioning is requisite in an assembly such as here considered for absorbing the shocks experienced when the parachute distends, at which time the effect of the suddenly expanded parachute, and the aeroplane's weight, form opposing forces of great moment during which periods of stress something would give way were the coupling assembly rigidly articulated. The aforesaid plunger-bumper element has an auxiliary rod 10', which has anchored at its terminal, the trip rope R; the said rope is trained over an appropriate sheave r in the landing rigging so that, when the bumper is forced up as in landing a pull will be exerted on the said rope which unhasps the latch L' of the bar L thereby releasing the parachute whose expanse might still obtain to uncontrollably drag the aeroplane. The uncoupling may also be effected within the plane by pulling the rope R at R'.

When an aeroplane becomes unmanageable through accident, engine trouble or fire, the parachute is released for expansion, at which time the occupants avail themselves of the life-saving equipment provided by the appendage 8 and its adjuncts 9. The roof of the cabin being formed by the folded parachute is then open and, with the passengers securely attached to the parachute, the aeroplane is cut off by pulling the trip rope R whereupon the plane falls, leaving the occupants suspended to the descent-retarding parachute.

It is here remarked that numerous methods of accommodating individuals in the matter of suspending appurtenances which would allow groups to be arranged in varying the preferred selection. This is, however, an optional selection as to equipment design. The present invention aims at a utilitarian phase which seeks to find storage space for a voluminous element and at the same time eliminate the handicap such an element forms as cargo if same is to be carried as cargo per se.

The shock absorbing means is purposely diagrammatic. There are endless arrangements of spring designs equally efficient here and for these reasons detailed structures, easily subject to the variations of design changes, are not regarded as pertinent when there is nothing mechanically incongruous residing in the foregoing disclosure.

Having described the invention what is claimed and desired to protect by United States Letters Patent, is:—

1. Flying equipment having a parachute, an aeroplane, a coupling means connecting together said parachute and said aeroplane, a reciprocative bumper for automatically affecting said means to break the coupling relation between the connected elements, and a shock absorbing instrumentality responsive for cushioning the shocks generated at the instant said parachute expands and when landing under parachute suspension.

2. A flying equipment having a descent retarding parachute forming a detachable aeroplane cabin roof, a fuselage portion including the cabin of said aeroplane offering its skeleton framework as the support for said parachute, said parachute normally arranged as the protecting roof closure for the cabin in said fuselage, a cable-like appendage attached to said parachute disposed within the cabin beneath said parachute, and spaced gripping elements integral with said appendage accessible as pendants within said portion.

3. Flying equipment having a parachute anchored to the framework of an aeroplane, coupling means intermediate between said parachute and said aeroplane forming part of the anchoring assembly, resilient shock absorbing instrumentalities between said parachute and said means, similar instrumentalities between said framework and the landing gear of said aeroplane, and reciprocative play allowable in said framework between said means and the last recited instrumentalities.

ROBERT J. MILLER.